United States Patent

Moser

[15] 3,693,678
[45] Sept. 26, 1972

[54] SHORT WOOD ATTACHMENT FOR TREE HARVESTERS

[72] Inventor: Raymond L. Moser, Tremont, Ill.

[73] Assignee: Caterpillar Tractor Co., Peoria, Ill.

[22] Filed: Dec. 28, 1970

[21] Appl. No.: 101,559

[52] U.S. Cl. .................................................. 144/2 Z
[51] Int. Cl. .............................................. A01g 23/02
[58] Field of Search ............ 143/46 R, 46 F; 144/3 D, 309AC, 144/246 G

[56] References Cited

UNITED STATES PATENTS

| | | | |
|---|---|---|---|
| 3,455,352 | 7/1969 | Sanders et al. | 143/46 R |
| 3,343,644 | 9/1967 | Kljuchnikov et al. | 143/46 R |
| 3,572,410 | 3/1971 | McElderry | 144/3 D |

Primary Examiner—Gerald A. Dost
Attorney—Fryer, Tjensvold, Feix, Phillips & Lempio and Felix, Phillips & Lempio

[57] ABSTRACT

A short wood or bucking attachment for a tree harvester of the type having a shear assembly, a drive mechanism and a processing implement arranged in operating alignment with the drive mechanism serving to propel or feed a tree past the implement and shear assembly, the attachment including a positive stop for accurately positioning the tree relative to the shear assembly, a sensing mechanism arranged between the stop and the shear assembly and a control unit for deactuating the drive mechanism and operating the shear assembly in response to engagement of the tree with the sensing mechanism, spacing between the sensing mechanism and stop permitting momentum of the tree to carry it into engagement with the stop after deactuation of the drive mechanism and before substantial cutting engagement of the shear assembly with the tree.

6 Claims, 4 Drawing Figures

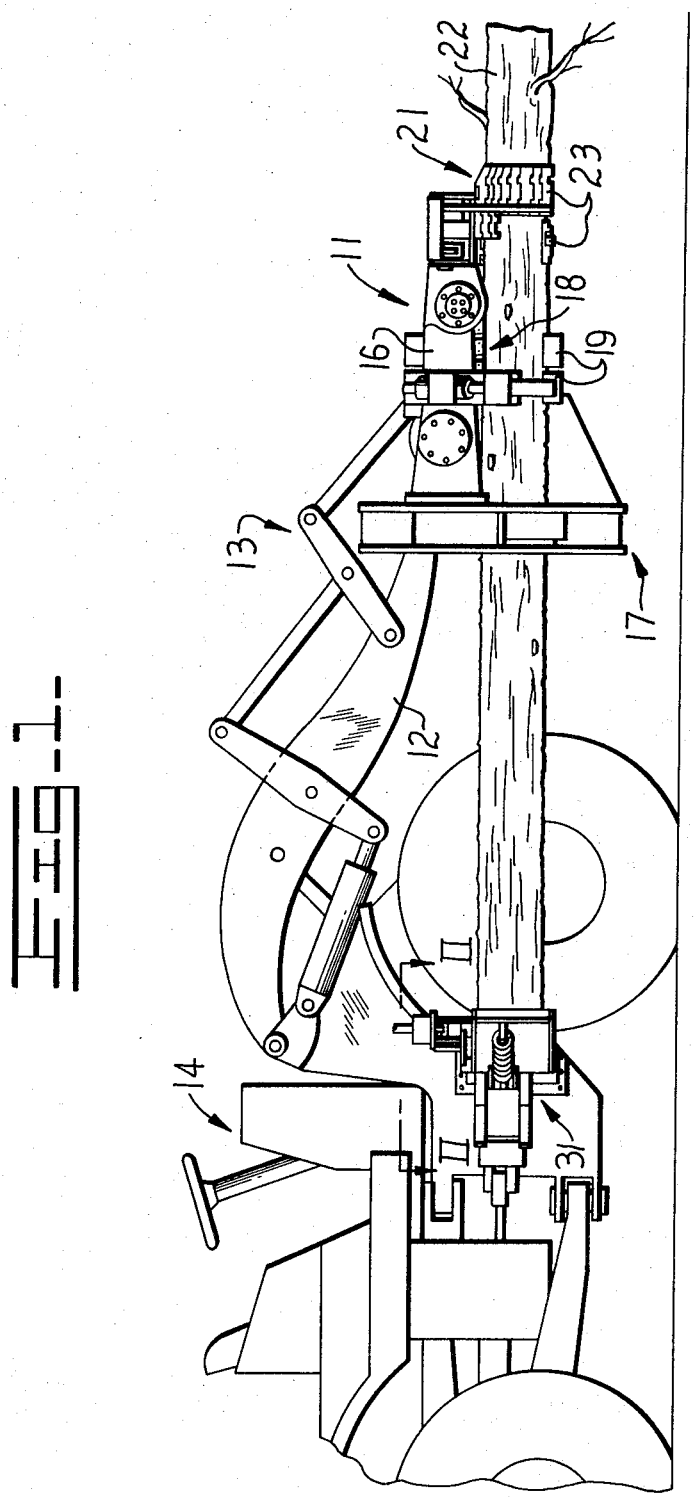

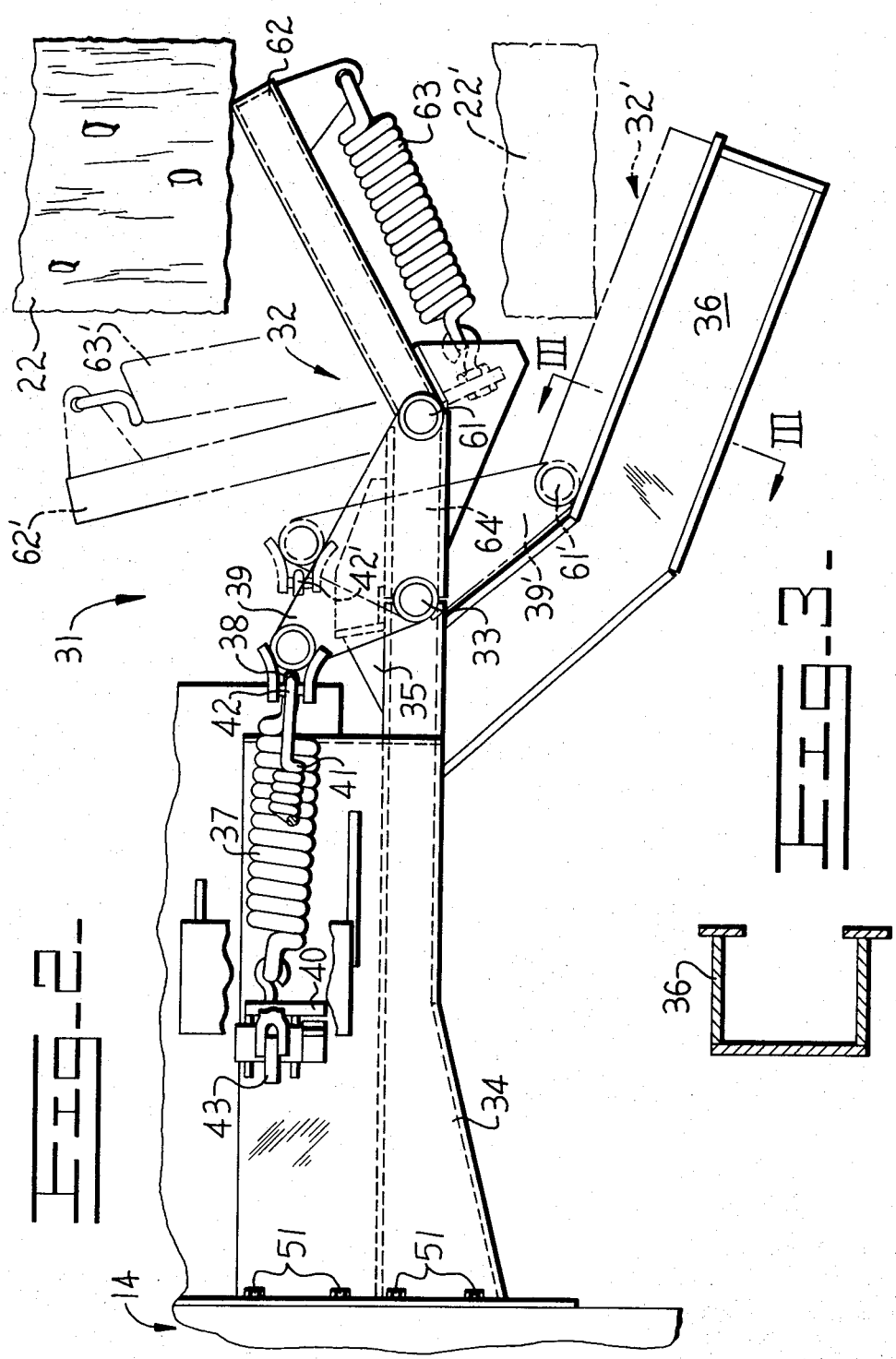

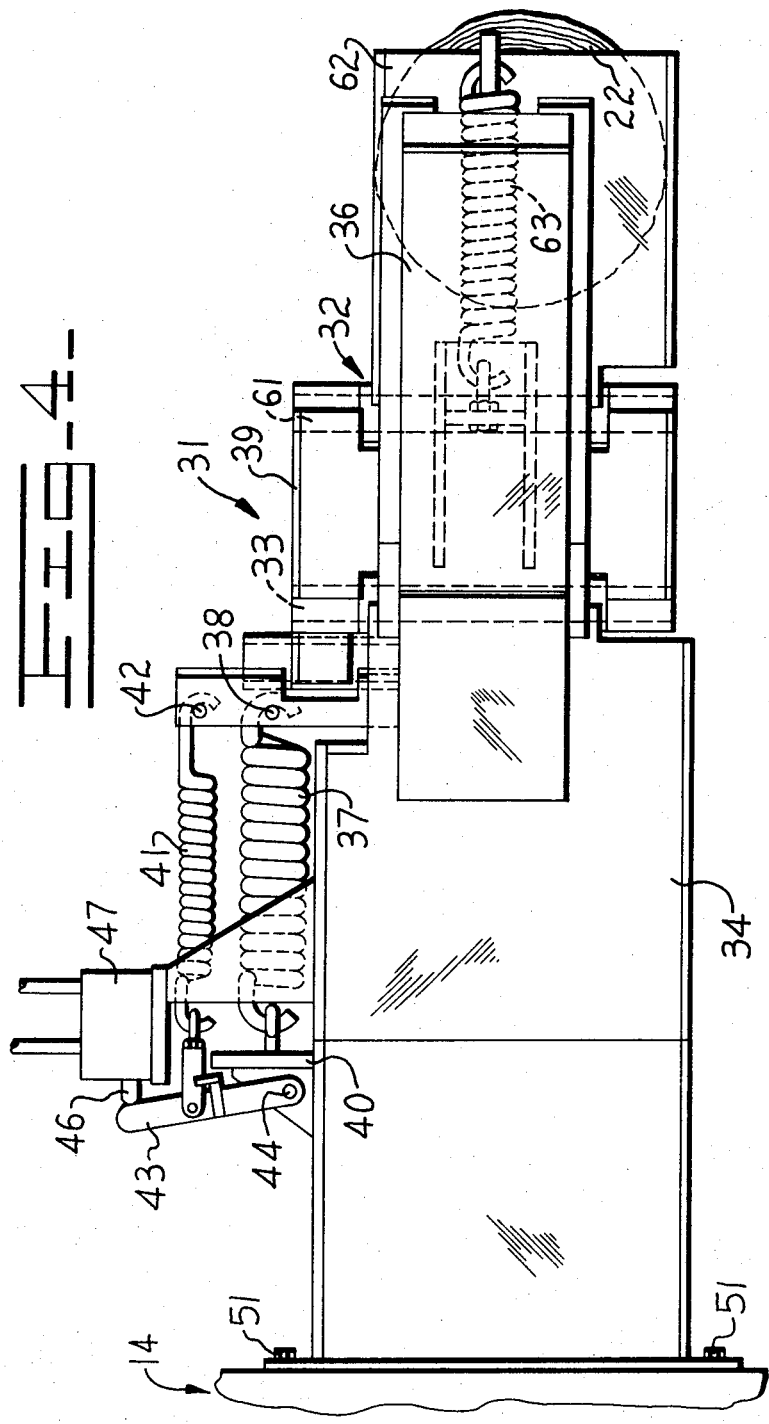

SHORT WOOD ATTACHMENT FOR TREE HARVESTERS

RELATED U.S. REFERENCES

A tree harvester of the type described below as a preferred environment for the present invention includes various components which are described in greater detail by U.S. Pat. application, Ser. No. 58,466, title "Shear Assembly for Tree Harvesters", filed July 27, 1970 by R.L. Moser, et al.; U.S. Pat. application, Ser. No. 58,467, titled "Delimbing Assembly for Tree Harvesters", filed on July 27, 1970 by R.L. Moser, et al.; and U.S. Pat. application, Ser. No. 58,465, titled "Drive Mechanism for Tree Harvesters", filed on July 27, 1970 by Nathan Gutman, et al., each of the above being assigned to the assignee of the present invention.

The present invention relates to a short wood or bucking attachment for tree harvesters and more particularly to such an attachment which functions in response to movement of the tree itself for accurately positioning the tree relative to a shear assembly in order to permit cutting of the tree into sections of closely controlled length.

In prior art tree harvesters, a separate saw or shear has commonly been employed for cutting a tree into sections. However, where the harvester includes other processing implements such as a delimber, the additional cutting means adds to the complexity of the machine and substantially increases the manipulative duties of the operator. In other prior art tree harvesters, a shear assembly used to cut standing trees has also been employed as a short wood or bucking means for cutting the tree into sections. However, although the use of a single shear for both of these functions reduces the complexity of the machine, the processing rate for the machine is still relatively low since each phase of the operation must commonly be regulated by the operator.

Accordingly, it is an object of the present invention to provide a relatively simple short wood attachment for tree harvesters and more particularly to provide such an attachment which requires a minimum of manipulative control by an operator.

It is also desirable to provide such an attachment with the capability of cutting a tree into sections of substantially equal length. It is difficult to maintain such uniformity for example, since varying momentum developed by the tree prior to deactuation of the drive mechanism tends to cause relatively wide variation between section lengths.

Accordingly, it is also an object of the present invention to provide a short wood attachment for tree harvesters having the capability of cutting a tree into sections of substantially equal length. It is a further object to provide such an attactment including resilient means such as a heavy spring for absorbing at least a portion of the momentum developed by movement of a tree through the machine prior to positioning of the tree with respect to the short wood cutting means.

Other objects and advantages of the present invention are made apparent in the following description having reference to the accompanying drawings.
In the drawings:

FIG. 1 is a side view in elevation of a tree harvester including the present short wood attachment;

FIG. 2 is a fragmentary plan view of the short wood attachment taken along section line II—II of FIG. 1;

FIG. 3 is a view taken along section line III—III of FIG. 2; and

FIG. 4 is an enlarged fragmentary view of the short wood attachment as seen from the left side of FIG. 1.

A tree harvester of the type illustrated in FIG. 1 includes a harvester attachment 11 pivotally secured to the lift arms, one of which is indicated at 12, and the tilt linkage 13 of a loader vehicle 14. The tree harvester attachment 11 has a rigid frame 16 for supporting a variety of components including a shear assembly 17, a drive mechanism 18, grapple arms 19 and a delimbing assembly 21 aligned upon the frame for processing a tree indicated at 22.

In order to process a standing tree with the harvester of FIG. 1, the harvester frame 16 is positioned in generally vertical alignment by the tilt mechanism 13 in order to receive a standing tree within the shear assembly 17, the grapple arms 19 and the delimber 21. The tree is maintained within the harvester attachment by hydraulically closing the grapple arms 19 and extending bladed elements 23 of the delimber 21 into processing engagement about the circumference of the tree. The standing tree is then cut by the shear assembly and rotated into a generally horizontal position as illustrated in FIG. 1. With the tree in that position, the drive mechanism 18 is actuated to propel or feed the tree in a leftwardly direction as viewed in FIG. 1, through the delimber 21 in order to remove branches and other projections from the tree.

Due to the alignment of the various components of the harvester attachment, the tree is also shifted leftwardly through or past the shear assembly 17 by the drive mechanism 18. The present invention provides a short wood attachment, generally indicated at 31 which is operatively associated with the drive mechanism 18 and shear assembly 17 in order to first deactuate the drive mechanism, then to accurately position the tree relative to the shear assembly and finally to actuate the shear assembly for cutting the tree into sections of closely controlled lengths. It is thus apparent that a control circuit (not shown) for operating the drive mechanism 18 and shear assembly 17 could be designed to again open the shear assembly after it has cut through the tree and to reactuate the drive mechanism so that a tree could be processed along its entire length without requiring further regulation by the operator.

Referring now to FIGS. 2 and 4 as well, the short wood attachment includes a gate member 32 arranged in spaced apart relation from the shear assembly 17 along the feed path for the tree 22. The gate 32 is pivotally mounted at 33 upon a support frame 34 which is secured to the vehicle 14. As best seen in FIG. 2, the tree engages the gate 32 in its position shown by solid lines with the gate being pivoted into another position illustrated in broken lines at 32' when the tree is in a position illustrated in broken lines and indicated at 22'. Movement of the tree and gate at their respective positions 22' and 32' is limited by a rigid arm 36 also arranged upon the support member 34 to provide a positive stop for leftward movement of the tree as may best be seen in FIG. 1. The rigid arm 36 is structurally reinforced as shown by the cross-sectional view of FIG. 3 in order to positively position the leftward end of the tree relative to the shear assembly 17.

Referring particularly to FIG. 2, the gate 32 tends to be normally maintained against a stop 35 in its solid line position between the rigid arm 36 and the shear assembly 17 by a relatively strong tension spring 37. The spring 37 is connected to the gate at 38 by means of a triangular plate 39 and at its other end to a bracket 40 rigidly mounted upon the support member 34. A relatively light tension spring 41 is also connected to the gate at 42 and at its opposite end to a lever 43 which is pivotally connected at 44 to the bracket 40. The free end of the lever 43 is arranged for contact with a spring loaded spool 46 in a pilot control valve 47. The length of the relatively light spring 41 is selected so that with the gate in its solid line position as indicated in FIG. 2, the lever 43 is just maintained in contact with the spool 46.

As the tree 22 engages the gate in its normal position indicated at 32, the lever 43 is urged rightwardly as viewed in FIG. 4 to shift the spool. The pilot valve 47 is connected through a generally conventional control circuit (not shown) with the drive mechanism 18 and shear assembly 17 so that operation of the spool 46 by the lever 43 deactuates the drive mechanism 18 and commences operation of the shear assembly 17.

With the drive mechanism 18 being deactuated, inertia or momentum of the tree and drive mechanism continues to shift the tree leftwardly as viewed in FIG. 1 until the tree and gate enter into positive engagement with the rigid arm 36 at their respective positions indicated at 22' and 32'. As the gate is being pivotally shifted toward the rigid arm, a portion of the momentum in the tree is absorbed by the relatively strong spring 37 to reduce the force of engagement between the tree and the rigid arm 36. The relatively light spring 41 prevents damaging forces from being transmitted to the control valve. The spacing between the gate in its normal position indicated at 32 and the rigid arm 36 is selected to assure that momentum of the tree will carry it into positive engagement with the rigid arm 36 so that the leftward end of the tree is always accurately positioned with respect to the shear assembly.

After the tree is positively engaged with the rigid arm 36, the shear assembly 17 continues in operation to cut through the tree. After a section at the left end of the tree has been cut and permitted to fall to the ground, the gate is returned to its solid line position at 32 primarily by the spring 37 and the lever 43 is again returned to the position illustrated in FIG. 4. The spring loaded spool 46 is thus permitted to shift leftwardly as viewed in FIG. 4 so that the control circuitry retracts the shear assembly 17 and again engages the drive mechanism 18 to continue moving the tree through the delimbers until it again comes in contact with the gate 32 which causes the bucking or sectioning process to be repeated as described above. Although the position of the tree is sensed by the lever 43 and spool 46 together with the light spring 41 and gate 32, it is apparent that other signal means such as a master cylinder valve or an electrical switch could also be employed to sense the position of the tree and thereby control operation of the drive mechanism 18 and shear assembly 17.

In order to change the length of sections cut from the tree by a substantial amount, the support frame 34 which is preferably secured to the vehicle 14 by cap screws such as those indicated at 51 could be relocated upon the vehicle, thus shifting the normal position of the gate 32 and rigid arm 36 with respect to the shear assembly 17. Minor changes in the section length could also be accomplished by the addition or removal of spacer plates or shims on the receiving surface of the rigid arm 36.

The gate 32 is also pivoted or articulated at 61 so that an outer end portion is free to move against a spring 63 toward a position illustrated in phantom at 62' by FIG. 2. Another portion 64 of the gate is rigidly connected to the triangular plate 39 and provides an intermediate link between the pivots 33 and 61. If a tree or other obstacle should contact the rear surface of the gate portion 62, it would be free to pivot forwardly, thus preventing damage to the gate or other portions of the short wood attachment, with the gate again being returned to its normal operating position by the spring 63.

What is claimed is:

1. A short wood attachment for a tree harvester of the type having a shear assembly, a drive mechanism and an implement arranged in operating alignment to provide a feed path for processing a tree, the drive mechanism being actuable to feed a tree past the implement and the shear assembly, the shear assembly being operable for cutting through the tree, comprising
   a positive stop spaced apart from the shear assembly along the feed path for abutting engagement of the tree with the stop,
   movable gate means arranged between the positive stop and the shear assembly, for engagement by the tree,
   control means for deactuating the drive mechanism and operating the shear assembly in response to the movable gate being engaged by the tree, and
   a relatively strong spring interconnected with the movable gate means and tending to maintain the movable gate means in spaced apart relation with the stop, spacing between the movable gate means and stop permitting momentum of the tree to carry it into abutting engagement with the stop after deactuation of the drive mechanism and before substantial cutting engagement of the shear assembly with the tree.

2. The attachment of claim 1 wherein the implement is a delimbing assembly with the drive mechanism being arranged between the delimbing and shear assemblies.

3. The attachment of claim 1 wherein the movable gate means is a member pivoted upon the harvester.

4. A short wood attachment for a tree harvester of the type having a shear assembly, a drive mechanism and an implement arranged in operating alignment to provide a feed path for processing a tree, the drive mechanism being actuatable to feed a tree past the implement and the shear assembly, the shear assembly being operable for cutting through the tree, comprising
   a positive stop spaced apart from the shear assembly along the feed path for abutting engagement of the tree with the stop, sensing means comprising a member pivoted upon the harvester arranged between the positive stop and shear assembly, for engagement by the tree, control means for deactuating the drive mechanism and operating the shear assembly in response to the sensing means being engaged by the tree, spacing between the sensing means and stop permitting momentum of the tree to carry it into abutting engagement with the stop after deactuation of the drive mechanism and before substantial cutting engagement of the shear assembly with the tree, a relatively strong spring interconnected between the pivoted member and the harvester for tending to maintain the pivoted member in spaced apart relation with the stop, and a relatively light spring interconnecting the pivoted member and control means for operating the control means substantially upon engagement of the tree with the pivoted member.

5. In a tree harvester of the type including a shear assembly and a drive mechanism for feeding a tree past the shear assembly which is operable for cutting through the tree, an attachment for deactuating the drive mechanism, accurately positioning the tree and operating the shear assembly to cut the tree into sections of preselected, closely controlled length, comprising sensing means arranged on a portion of the harvester in alignment with a feed path through the shear assembly and spaced apart from the shear assembly by less than the preselected section length, control means responsively associated with the sensing means for deactuating the drive mechanism and operating the shear assembly, and a positive stop arranged on the harvester in alignment with the feed path through the shear assembly and spaced apart from the shear assembly by the preselected section length, spacing between the sensing means and positive stop being such that momentum of the tree carries it into abutting engagement with the positive stop after deactuation of the drive mechanism and before the shear assembly is operated into substantial cutting engagement with the tree, the sensing means being a member pivoted upon the harvester and resiliently coupled with the control means, the pivoted member being articulated at a central portion for permitting its outer end to collapse toward the shear assembly, a spring tending to maintain the pivoted member in an extended condition.

6. In a tree harvester of the type including a shear assembly and a drive mechanism for feeding a tree past the shear assembly which is operable for cutting through the tree, an attachment for deactuating the drive mechanism, accurately positioning the tree and operating the shear assembly to cut the tree into sections of preselected, closely controlled length, comprising sensing means arranged on a portion of the harvester in alignment with a feed path through the shear assembly and spaced apart from the shear assembly by less than the preselected section length, control means responsively associated with the sensing means for deactuating the drive mechanism and operating the shear assembly, a positive stop arranged on the harvester in alignment with the feed path through the shear assembly and spaced apart from the shear assembly by the preselected section length, spacing between the sensing means and positive stop being such that momentum of the tree carries it into abutting engagement with the positive stop after deactuation of the drive mechanism and before the shear assembly is operated into substantial cutting engagement with the tree, the sensing means being a member pivoted upon the harvester and resiliently coupled with the control means a relatively strong spring being interconnected between the pivoted member and the harvester for resisting movement of the tree toward the stop after engagement with the pivoted member, and a relatively light spring interconnecting the pivoted member with an operating portion of the control means for causing the control means to deactuate the drive mechanism and initiate operation of the shear assembly substantially upon engagement of the tree with the pivoted member.

* * * * *